United States Patent
Al-Haj Ali et al.

(10) Patent No.: US 11,440,983 B2
(45) Date of Patent: Sep. 13, 2022

(54) PHASE-STABILIZED ETHYLENE ALPHA OLEFIN COPOLYMERIZATION PROCESS

(71) Applicant: Borealis AG, Vienna (AT)

(72) Inventors: Mohammad Al-Haj Ali, Porvoo (FI); Henry Sleijster, Sittard-Geleen (NL)

(73) Assignee: Borealis AG, Vienna (AT)

( * ) Notice: Subject to any disclaimer, the term of this patent is extended or adjusted under 35 U.S.C. 154(b) by 185 days.

(21) Appl. No.: 16/761,917

(22) PCT Filed: May 22, 2018

(86) PCT No.: PCT/EP2018/063384
§ 371 (c)(1),
(2) Date: May 6, 2020

(87) PCT Pub. No.: WO2019/137634
PCT Pub. Date: Jul. 18, 2019

(65) Prior Publication Data
US 2020/0325257 A1 Oct. 15, 2020

(30) Foreign Application Priority Data

Jan. 10, 2018 (EP) ..................................... 18150988

(51) Int. Cl.
*C08F 210/16* (2006.01)
*C08F 2/01* (2006.01)
(Continued)

(52) U.S. Cl.
CPC .............. *C08F 210/16* (2013.01); *C08F 2/01* (2013.01); *C08F 2/04* (2013.01); *C08F 2/06* (2013.01); *C08F 6/06* (2013.01); *C08F 2420/00* (2013.01)

(58) Field of Classification Search
CPC ...... C08F 2/04; C08F 2/06; C08F 2/01; C08F 210/02; C08F 6/06
See application file for complete search history.

(56) References Cited

U.S. PATENT DOCUMENTS 4,433,121 A * 2/1984 Kabu .................. C08F 10/00
 526/68
4,946,940 A * 8/1990 Guckes .................. C08F 6/12
 528/483

(Continued)

FOREIGN PATENT DOCUMENTS

CA 2598960 A1 2/2009

OTHER PUBLICATIONS

International Search Report from PCT/EP2018/063384 dated Sep. 27, 2018.

*Primary Examiner* — Rip A Lee
(74) *Attorney, Agent, or Firm* — Fay Sharpe LLP (57) ABSTRACT

A process for copolymerizing ethylene and at least one C3 to C8 alpha olefin to obtain an ethylene-C3 to C8 alpha olefin copolymer, the process comprising a) copolymerizing ethylene and at least one C3 to C8 alpha olefin in a solvent in a solution polymerization reactor to obtain an intermediate polymer solution, b) discharging an effluent stream from the intermediate polymer solution into a heat exchanger, c) setting the temperature of the effluent stream in the heat exchanger to obtain a heated effluent stream, d) feeding the heated effluent stream to a flash separation, e) separating at least a part of the ethylene-C3 to C8 alpha olefin copolymer in the flash separation, characterized by feeding an inert hydrocarbon fulfilling 90° C.<T(BP)<130° C. to the solution polymerization reactor; and/or accumulating an inert hydrocarbon fulfilling 90° C.<T(BP)<130° C. during the polymerization reaction; and/or feeding an inert hydrocarbon fulfilling 90° C.<T(BP)<130° C. to the discharged effluent stream of step b).

14 Claims, 2 Drawing Sheets

(51) Int. Cl.
  *C08F 2/04* (2006.01)
  *C08F 6/06* (2006.01)
  *C08F 2/06* (2006.01)

(56) References Cited

U.S. PATENT DOCUMENTS

| | | | | |
|---|---|---|---|---|
| 5,599,885 | A * | 2/1997 | Kawasaki | C08F 6/003 526/68 |
| 6,881,800 | B2 * | 4/2005 | Friedersdorf | B01J 10/002 526/68 |
| 7,163,989 | B2 * | 1/2007 | Friedersdorf | B01J 19/002 526/68 |
| 7,650,930 | B2 * | 1/2010 | Cheluget | C08F 10/02 165/95 |
| 7,919,568 | B2 * | 4/2011 | Cheluget | C08F 10/02 526/74 |
| 9,018,328 | B2 * | 4/2015 | Jog | C08F 10/02 526/348 |
| 9,815,913 | B2 * | 11/2017 | Costin | C08F 210/18 |
| 10,370,471 | B2 * | 8/2019 | Karjala | C08F 2/04 |
| 2008/0033127 | A1 * | 2/2008 | Jiang | C08F 10/06 526/206 |
| 2010/0063338 | A1 * | 3/2010 | Kiss | C08F 10/02 585/518 |
| 2020/0370849 | A1 * | 11/2020 | Greenhalgh | F28F 19/00 |

* cited by examiner

Figure 1

Figure 2

PHASE-STABILIZED ETHYLENE ALPHA OLEFIN COPOLYMERIZATION PROCESS

This application is a 371 of PCT/EP2018/063384, filed May 22, 2018, which claims priority to European Application No. 18150988.6, filed Jan. 10, 2018, the contents of which are fully incorporated in their entirety herein.

The present invention is concerned with an ethylene alpha olefin copolymerization process and particularly with phase stabilization during polymerization and phase stabilization during downstream treatment of the effluent stream withdrawn from the solution polymerization reactor. The present invention is further concerned with the use of an inert hydrocarbon for maintaining a single phase in an ethylene alpha olefin copolymerization process.

BACKGROUND OF THE INVENTION

In solution polymerization, product polymer is molten and remains dissolved in the solvent under reactor conditions, forming a polymer solution. After a pre-determined residence time, the polymer solution leaving the reactor as an effluent stream is typically fed to a flash separation system for volatile components; e.g. solvent, monomer and comonomer, removal. Flash separation also removes unreacted monomers from the polymer solution.

Under certain conditions of temperature and pressure, the polymer solution can phase separate into two distinct liquid phases, one which is "lean" in dissolved polymer and one which is "rich" in dissolved polymer. Phase separation occurs at the lower critical solution temperature (LCST), also known as the "cloud point".

This phenomenon of phase separation is well known in the art for many years. Details regarding phase separation, in particular for ethylene (co)polymers containing solutions, can, for instance, be found in de Loos et al., "Liquid—Liquid Phase Separation in Linear Low Density Polyethylene Solvent Systems", Fluid Phase Equilibria 117 (1996) 40-47, Irani et al., "Lower Critical Solution Temperature Behavior of Ethylene Propylene Copolymers in Multicomponent Systems", Journal of Applied Polymer Science, Vol. 31, 1879-1899 (1986), Chan et al., "Fluid-Liquid Transitions of Poly(ethylene-co-octene-1) in Supercritical Ethylene Solutions," Ind. Eng. Chem. Res. 2000, 39, 4370-4375, Nagy et al., "High pressure phase equilibria in the system linear low density polyethylene+isohexane: Experimental results and modelling", J. of Supercritical Fluids 40 (2007) 125-133, in "Handbook of Polymer Synthesis, Characterization, and Processing" First edition, edited by Enrique Saldivar-Guerra, Eduardo Vivaldo-Lima, published 2013 by John Wiley & Sons, Inc, in particular chapter 15, pages 317 to 334, as well as in the references cited in the aforementioned documents.

Increasing the temperature or decreasing the pressure at the cloud point leads to further phase separation. In other words, phase separation is encouraged by higher temperatures and/or by lower pressures. The cloud point is determined in part by the pressure, temperature, solution composition and the solvent used for polymerization.

It is generally undesirable to have phase separation occur within the polymerization reactor since this leads to considerable reduction in the productivity. Thus, process conditions such as monomer concentration, temperature and pressure should be controlled to avoid liquid-liquid phase separation. This is particularly demanding when heating an effluent stream prior to flash separation. For economic reasons such heating usually will be effected via a heat exchanger. Thus, any polymer depositions at the walls of the heat exchanger have to be avoided.

Maintaining a single phase during copolymerization and during withdrawal as well as heating of an effluent becomes particularly demanding when there is a need to keep large ethylene inventory inside the polymerization reactor, e.g. production of polyolefin copolymers with relatively high molecular weight.

Multicomponent systems with relatively high amounts of ethylene are particularly prone to phase separation.

WO 02/34795 teaches the importance of selecting an appropriate polymerization solvent. According to WO 02/34795 solvents such as octane in contrast to hexane can maintain homogenous one-phase conditions at lower pressures; however, it will not be possible to use 1-octene as comonomer since considerable energy is needed to separate the solvent and the comonomer. WO 02/34795 further teaches raising the pressure to at least 75 bar of the feed from the reactor to pressure reducing means. Practically by far higher pressures are required for guaranteeing absence of phase separation.

WO 2016/204874 discloses a method for continuous polymerization, whereby the critical pressure and the critical temperature are determined utilizing the Heidermann-Khalil formulation of solution criticality which utilizes the Peng-Robinson or Soave-Redlich-Kwong equations of state. The polymer solution is then heated to a temperature that is less than the critical temperature, particularly a temperature that is within 10° C. of the critical temperature and/or a pressure that is within 20 psig (<1.4 bar) of the critical pressure.

WO 2011/087729 is concerned with continuous solution polymerization processes and apparatus and teaches the use of a non-polar solvent which does not coordinate or interfere in a meaningful way so as to inhibit the catalytic action of the catalyst system. WO 2011/087729 further teaches the use of a low boiling, alkane based solvent, optionally mixtures of alkanes, which may be linear or branched, such as those having from 4 to 10 carbon atoms, with hexane and particularly isohexane being preferred.

It is an object of the present invention to provide a process for copolymerizing ethylene and at least one C3 to C8 alpha olefin to obtain an ethylene-C3 to C8 alpha olefin copolymer in a solution polymerization reactor in which no phase separation occurs upstream the first flash separation.

It is in particular an object of the present invention to provide such a process where a single phase is maintained in the solution polymerization reactor, in the effluent stream discharged from the solution polymerization reactor, in the heat exchanger and in the heated effluent stream withdrawn from the heat exchanger and to be fed to a first flash separation.

It is a further object of the present invention to provide a process for copolymerizing ethylene and at least one C3 to C8 alpha olefin to obtain an ethylene-C3 to C8 alpha olefin copolymer in a solution polymerization reactor being operated more economically and smoother and at the same time maintaining a single phase as described above.

The present invention is based on the finding that phase separation, when copolymerizing ethylene and at least one C3 to C8 alpha olefin to yield an ethylene-C3 to C8 alpha olefin copolymer in a solution polymerization reactor, can be avoided during polymerization as such and further can be avoided for an effluent stream, including a heated effluent stream to be fed to a first flash separation, by feeding an inert hydrocarbon fulfilling 90° C.<T(BP) <130° C. to the solution polymerization reactor and/or by accumulating such inert hydrocarbon fulfilling 90° C.<T(BP)<130° C. during the polymerization reaction; and/or by feeding an inert hydrocarbon fulfilling 90° C.<T(BP)<130° C. to an effluent stream discharged from the solution polymerization reactor before heating the same.

The present invention insofar provides a process for copolymerizing ethylene and at least one C3 to C8 alpha olefin to obtain an ethylene-C3 to C8 alpha olefin copolymer, the process comprising
 a) copolymerizing ethylene and at least one C3 to C8 alpha olefin in a solvent in a solution polymerization reactor to obtain an intermediate polymer solution,
 b) discharging an effluent stream from the intermediate polymer solution into a heat exchanger,
 c) setting the temperature of the effluent stream in the heat exchanger to obtain a heated effluent stream,
 d) feeding the heated effluent stream to a first flash separation,
 e) separating at least a part of the ethylene-C3 to C8 alpha olefin copolymer in the first flash separation,
 characterized by
  feeding an inert hydrocarbon fulfilling 90° C.<T(BP)<130° C. to the solution polymerization reactor;
  and/or
  accumulating an inert hydrocarbon fulfilling 90° C.<T(BP)<130° C. during the polymerization reaction;
  and/or
  feeding an inert hydrocarbon fulfilling 90° C.<T(BP)<130° C. to the discharged effluent stream of step b).

It has been surprisingly found that an inert hydrocarbon fulfilling 90° C.<T(BP)<130° C. increases the lower critical solution temperature (LCST) or de-mixing temperature of a reaction mixture or intermediate polymer solution as present when copolymerizing ethylene and at least one C3 to C8 alpha olefin to obtain an ethylene-C3 to C8 alpha olefin copolymer, in solution using a solvent.

Further surprisingly it has been found the inert hydrocarbon fulfilling 90° C.<T(BP)<130° C. can be iso-octene. In a further surprising aspect, it has been found that iso-octene is not copolymerized during the polymerization although a double bond is present. Without wishing to be bound by theory it is believed that steric hindering is the main factor for behaving inert under the reaction conditions.

It has been further surprisingly found that the process can be operated more economically and smoother, for instance at lower pressure, and at the same time maintaining a single phase upstream the first flash separation as described above so that, for instance, fouling of the heat exchanger can be avoided.

Moreover, the process according to the present invention is particularly advantageous when the ethylene content is relatively high, as relatively high ethylene content usually results in a relatively low critical temperature making it more difficult to avoid unwanted phase separation. In other words, polymers having high ethylene content are more prone to phase separation. In a further aspect, the process according to the invention is advantageous in case lighter co-monomers, such as propylene and/or 1-butene, are used.

In a further aspect, the inventive process is particularly advantageous when the desired molecular weight of the target polymer is relatively high as well as polymer density. A high molecular weight and/or high polymer density increase criticality of phase separation.

The present invention is further concerned with the use of an inert hydrocarbon fulfilling 90° C.<T(BP)<130° C. for maintaining single phase of an effluent stream originating from co-polymerization of ethylene and at least one C3 to C8 alpha olefin in solution polymerization during withdrawal from a solution polymerization reactor.

In a further aspect the present invention is concerned with the use of an inert hydrocarbon fulfilling 90° C.<T(BP)<130° C. for maintaining single phase of a heated effluent stream originating from polymerization of ethylene and at least one C3 to C8 alpha olefin in solution polymerization, and heated in a heat exchanger, preferably to at least 200° C.

Definitions

"At least one C3 to C8 alpha olefin" means that comonomer, i.e. other than ethylene, may be selected from alpha olefins having 3 to 8 carbon atoms. This includes also mixtures of alpha olefins such as, for example, mixtures of 1-hexene and 1-octene.

The term "copolymer" as used herein is to be understood to be a polymer of ethylene and one or more C3 to C8 alpha olefin co-monomers. This means that also, for instance, terpolymers are encompassed by the term copolymer.

"Inert hydrocarbon" denotes any hydrocarbon which does not exceed 5% of the total reaction rate of the polymerization reaction with the same catalyst.

"Using n-hexane as solvent" is to be understood such that the solvent must comprise n-hexane as the predominant solvent component. Predominant solvent component means more than 50 wt. % of all components to be considered as solvents.

"Flash separation" denotes any separation step involving pressure reduction leading to phase separation.

"Solution polymerization reactor" denotes any reactor suitable for solution polymerization.

"Solution polymerization" refers to a polymerization process in which the polymer is dissolved in a liquid polymerization system, such as an inert solvent(s) and monomer(s). The temperature of a solution polymerization is below the supercritical or pseudo supercritical temperature; nevertheless, the polymerization conditions (temperature and pressure) are selected so single homogeneous polymerization phase is guaranteed in the reactor.

"Metallocene catalyst" denotes a catalyst having a single catalytic site, consisting of an organo-metal coordination compound in which one or two cyclopentadienyl rings with or without substituents are bonded to a central transition-metal atom.

"Catalyst system" denotes a catalyst precursor/activator pair. "Catalyst system" can also include more than one activated catalyst and more than one activator.

The lower critical solution temperature (LCST), which is herein also referred to as "de-mixing temperature", is the critical temperature below which the components of a mixture are miscible. Phase separation occurs at temperatures, which are at and above the LCST.

SUMMARY OF THE INVENTION

The present invention concerns a process copolymerizing ethylene and at least one C3 to C8 alpha olefin to obtain an ethylene-C3 to C8 alpha olefin copolymer, the process comprising
 a) copolymerizing ethylene and at least one C3 to C8 alpha olefin in a solvent in a solution polymerization reactor to obtain an intermediate polymer solution,
 b) discharging an effluent stream from the intermediate polymer solution into a heat exchanger, c) setting the temperature of the effluent stream in the heat exchanger to obtain a heated effluent stream,
d) feeding the heated effluent stream to a first flash separation,
e) separating at least a part of the ethylene-C3 to C8 alpha olefin copolymer in the first flash separation, characterized by
feeding an inert hydrocarbon fulfilling 90° C.<T(BP) <130° C. to the solution polymerization reactor; and/or
accumulating an inert hydrocarbon fulfilling 90° C.<T (BP)<130° C. during the polymerization reaction; and/or
feeding an inert hydrocarbon fulfilling 90° C.<T(BP) <130° C. to the discharged effluent stream of step b).

Adding an inert hydrocarbon fulfilling 90° C.<T(BP) <130° C. increases the de-mixing temperature of the intermediate polymer solution, the effluent stream, the heated effluent stream and, thus, no phase separation takes place upstream of the first flash separation. In other words, the inert hydrocarbon fulfilling 90° C.<T(BP)<130° C. acts as a phase stabiliser and maintains a single phase of the intermediate polymer solution, the effluent stream and the heated effluent stream.

T(BP) refers to the boiling point of the inert hydrocarbon at 1 atm, i.e. at 1,01325·10$^5$ Pa.

Preferably, the intermediate polymer solution in the solution polymerization reactor comprises between 0.05 and 30 wt. % inert hydrocarbon fulfilling 90° C.<T(BP)<130° C., more preferably between 0.1 and 25 wt. %, and most preferably between 0.2 and 20 wt. %, based on the total weight of the intermediate polymer solution.

The inert hydrocarbon fulfilling 90° C.<T(BP)<130° C. is preferably a paraffinic hydrocarbon having 7 or 8 carbon atoms, an olefin having 7 or 8 carbon atoms, or mixtures thereof.

Preferably, the inert hydrocarbon fulfilling 90° C.<T(BP) <130° C. comprises iso-octene, 4-Methyl-3-heptene, 3-Ethyl-2-hexene, 3-Methyl-3-heptene, 2,3-Dimethyl-2-hexene, 3-Methyl-2-heptene, 3,4-Dimethyl-trans-3-hexene, 2-Methyl-2-heptene, or mixtures thereof. The inert hydrocarbon fulfilling 90° C.<T(BP)<130° C. more preferably comprises iso-octene. The inert hydrocarbon fulfilling 90° C.<T(BP)<130° C. still more preferably comprises at least 95 wt. % iso-octene, still more preferably comprises at least 97 wt. % iso-octene, still more preferably comprises at least 99 wt. % iso-octene, still more preferably comprises at least 99.5 wt. % iso-octene and most preferably comprises at least 99.9 wt. % iso-octene, based on the total amount of inert hydrocarbon fulfilling 90° C.<T(BP)<130° C.

The inert hydrocarbon fulfilling 90° C.<T(BP)<130° C. can be fed together with ethylene and the at least one C3 to C8 alpha olefin comonomer, optionally with solvent and/or chain transfer agent, via an inlet into the solution polymerization reactor. The inert hydrocarbon fulfilling 90° C.<T (BP)<130° C. can alternatively be fed via a separate inlet into the solution polymerization reactor.

The inert hydrocarbon fulfilling 90° C.<T(BP)<130° C. can be fed to the effluent stream discharged from the solution polymerization reactor.

The inert hydrocarbon fulfilling 90° C.<T(BP)<130° C. fed to the solution polymerization reactor and/or to the effluent stream can be taken from an external source, such as a tank or container. Inert hydrocarbon taken from an external source can thus be called "fresh inert hydrocarbon".

Preferably, accumulating the inert hydrocarbon fulfilling 90° C.<T(BP)<130° C. during the polymerization reaction is done by recovering the inert hydrocarbon from the first flash separation, and recycling the recovered inert hydrocarbon back to the solution polymerisation reactor. This has the advantage that little or even no fresh inert hydrocarbon fulfilling 90° C.<T(BP)<130° C. has to be fed to the process as described above. Optionally, recovering the inert hydrocarbon fulfilling 90° C.<T(BP)<130° C. can also be done from the second flash separator, and the recovered inert hydrocarbon from both the first and the second flash separation is recycled back to the solution polymerization reactor.

The copolymerization of ethylene and the at least one C3 to C8 alpha olefin in solution in step a) according to the present invention takes place at a temperature of preferably at least 140° C., more preferably at least 150° C. More preferably the polymerization temperature is maintained within the range of 140 to 250° C. Most preferably the polymerization temperature is maintained within the range of 155 to 235° C.

The pressure in the polymerisation reactor depends on the temperature, on one hand, and the type and the amount of the comonomer, on the other hand. The pressure is preferably from 70 to 150 bar, and more preferably from 80 to 140 bar.

Preferably, the at least one C3 to C8 alpha olefin is selected from the group of propene, 1-butene, 1-pentene, 1-hexene, 1-heptene and 1-octene, or mixtures thereof. More preferably, the C3 to C8 alpha olefin is 1-octene.

The process is particularly advantageous when the comonomer is 1-octene and iso-octene is used as the inert hydrocarbon fulfilling 90° C.<T(BP)<130° C. since iso-octene is inert and can thus be accumulated in the process. This means substantial cost cuts are possible.

Usually the C3 to C8 alpha olefin will be only one comonomer, i.e. a copolymer will be produced by the process according to the invention. However, the preparation of terpolymers or ethylene polymers with more than two comonomers is also encompassed. For example, ethylene-butylene-1-octene terpolymers can be produced by the process according to the invention.

In the process according to the invention, copolymerization of ethylene and the at least one C3 to C8 alpha olefin comonomer in step a) in the solution polymerization reactor takes place in the presence of a polymerization catalyst.

The polymerisation catalyst may be any catalyst known in the art which is capable of polymerising ethylene and the at least one C3 to C8 alpha olefin comonomer. Thus, the polymerisation catalyst may be a Ziegler-Natty catalyst as disclosed in EP-A-280352, EP-A-280353 and EP-A-286148, or it may be a metallocene catalyst as disclosed in WO-A-1993025590, U.S. Pat. No. 5,001,205, WO-A-1987003604 and U.S. Pat. No. 5,001,244.

A chain transfer agent may be optionally used in the solution polymerization reactor for controlling the molecular weight of the copolymer as it is known in the art. A suitable chain transfer agent is, for instance, hydrogen.

A solvent is suitably present in the polymerisation process. The solvent must be inert towards the polymerisation catalyst and the monomers. Further, it should be stable in the polymerisation conditions. It further must be able to dissolve the monomer, the comonomer(s), the eventual chain transfer agent and the polymer in the polymerisation conditions. The solvent preferably comprises, or consists of, a straight-chain, cyclic or branched alkyl having from 5 to 7 carbon atoms, or a mixture of two or more thereof. More preferably, the solvent comprises, or consists of, a straight-chain, cyclic or branched alkyl having 6 carbon atoms, or a mixture of two or more thereof. Even more preferably, the solvent comprises, or consists of, isomers of hexane, or a mixture of two or more isomers of hexane. Isomers of hexane are n-hexane, 2-methylpentan, 3-methylpentan, 2,2-dimethylbutan and 2,3-dimethylpentan. Most preferably, the solvent comprises, or consists of, n-hexane.

Ethylene as monomer, at least one C3 to C8 alpha olefin as comonomer(s), catalyst, solvent and optionally the chain transfer agent are fed to the solution polymerization reactor and copolymerized so as to obtain an intermediate polymer solution. The intermediate polymer solution comprises unreacted monomer and unreacted comonomer(s), dissolved product copolymer being the ethylene-C3 to C8 alpha olefin copolymer and solvent, and optionally a chain transfer agent. An effluent stream of said intermediate polymer solution is discharged from the polymerization reactor via an outlet and fed into a heat exchanger.

The effluent stream discharged from the solution polymerization reactor preferably comprises from 10 to 35 wt. % product copolymer, more preferably from 12 to 30 wt. % product copolymer, and most preferably from 15 to 25 wt. % product copolymer, based on the total weight of the effluent stream.

Heat Exchanger

It is self-explaining that increasing temperature within the heat exchanger is a particularly critical process step as the effluent stream, i.e. the reaction mixture containing the polymer in solution, the residual monomers and the solvent(s) are already close to the lower critical solution temperature (LOST), frequently also denoted as cloud point. Phase separation within the heat exchanger should of course be avoided as fouling can occur, whereby the performance of the heat exchanger will be severely affected.

In the process according to the present invention in step c), i.e. the step of heating the effluent stream, the temperature of the effluent stream is preferably set to a temperature within 200 to 280° C., more preferably 200 to 250° C. Thereby, a heated effluent stream is obtained, which is fed to a first flash separation.

As discussed above, the pressure in the heat exchanger is preferably from 70 to 150 bar, more preferably from 75 to 130 bar.

Flash Separation

In step d) of the process according to the invention, the heated effluent stream from the heat exchanger is fed to the first flash separation. Preferably, a second flash separation is located downstream of the first flash separation. More preferably, a second flash separation is located downstream of the first flash separation and a third flash separation is located downstream of the second flash separation.

Flash separation usually takes place in a flash vessel or flash separator, preferably having generally cylindrical shape. Thereby, the flash separator has a section which has approximately a circular cross-section. Preferably, the flash separator has a cylindrical section which has the shape of a circular cylinder. In the flash separation a liquid phase and a vapour phase are formed. The vapour phase comprises volatile compounds such as e.g. solvent, monomer and comonomer(s).

The heated effluent solution usually enters the first flash separator at the top.

During flash separation, which is well known in the art for decades, the pressure of the system is drastically reduced. For example, a typical pressure of 75 to 150 bar as used according to the present invention is reduced to preferably 15 bar or less in the first and/or second flash separation. The pressure in the first and/or second flash separation is more preferably between 10 and 0.5 bar, and most preferably between 7 and 1 bar.

The temperature in the first and/or second flash separation is typically between 200 and 280° C.

In the first flash separation, at least a part of the ethylene-C3 to C8 alpha olefin copolymer is separated in step e). Preferably, at least 50 wt. % of the ethylene-C3 to C8 alpha olefin copolymer is separated in step e), more preferably at least 75 wt. %, even more preferably at least 90 wt. %, and most preferably at least 95 wt. %. The separated ethylene-C3 to C8 alpha olefin copolymer is usually withdrawn from a bottom outlet of the first flash separator or first flash vessel.

In the process according to the present invention, the ethylene-C3 to C8 alpha olefin separated in step e) is preferably directed into a second flash separation downstream of the first flash separation. The ethylene-C3 to C8 alpha olefin separated in step e) usually enters the second flash separator at the top. In the second flash separation volatile compounds, such as monomer, comonomer(s) and solvent, are further separated from the obtained product copolymer.

Recycling is remarkably facilitated in the present invention as control and particularly lowering of the LOST allows good heat exchanger performances and insofar enables improved C3 to C8 alpha olefin separation.

Ethylene-C3 to C8 Alpha Olefin Copolymer

The process according to the present invention is generally concerned with the preparation of ethylene-C3 to C8 alpha olefin copolymers having a $MFR_2$ (2.16 kg, 190° C.) of preferably lower than 100 g/10 min, more preferably lower than 10 g/10 min and most preferably lower than 1.0 g/10 min, determined according to ISO 1133-1. Copolymers having a low $MFR_2$ intrinsically require relatively high ethylene content, whereby such high ethylene content results in the solution being more prone to phase separation.

The obtained ethylene-C3 to C8 alpha olefin copolymer comprises, preferably consist of, units derived from ethylene and one or more C3 to C8 alpha olefin derived units. The total amount of the C3 to C8 alpha olefin derived units in the obtained copolymer is preferably not more than 50 wt. %, more preferably not more than 40 wt. %, and most preferably not more than 35 wt. %.

In preferred embodiments, the obtained ethylene-C3 to C8 alpha olefin copolymer comprises, preferably consist of, units derived from ethylene and 1-octene derived units, whereby the total amount of 1-octene derived units in the obtained copolymer is preferably not more than 50 wt. %, more preferably not more than 40 wt. %, and most preferably not more than 35 wt. %.

Preferably, the obtained ethylene-C3 to C8 alpha olefin copolymer has a weight average molecular weight (Mw) of between 50,000 and 180,000 g/mol, more preferably between 65,000 and 160,000 g/mol, and most preferably between 80,000 and 150,000 g/mol, determined according to ISO 16014-4:2012.

The ethylene-C3 to C8 alpha olefin copolymer obtained from the process according to the invention has a melt flow rate $MFR_2$ (2.16 kg, 190° C.) preferably of equal or below 100 g/10 min, more preferably equal or below 10 g/10 min and most preferably equal or below 1.0 g/10 min 1.0 g/10 min, determined according to ISO 1133-1.

In the process according to the present invention the temperatures in steps a), b) and c) is kept below the lower critical solution temperature (LOST) or de-mixing temperature so as to maintain a single phase of the reaction solution.

In the process according to the present invention the pressure in the solution polymerization reactor and in the heat exchanger is usually from 80 to 140 bar as described above. Using, for instance, online monitoring, the skilled person can optimize the pressure depending on the actual composition. It goes without saying that lower pressures are economically preferred.

As shown in the experimental part, the amount of an inert hydrocarbon fulfilling 90° C.<T(BP)<130° C. allows lowering the pressure for a given system of monomers and comonomer(s): higher amounts of an inert hydrocarbon fulfilling 90° C.<T(BP)<130° C. allow the use of lower pressures without that phase separation occurs in the system upstream the flash separation.

USE

In yet a further aspect, the present invention is concerned with the use of an inert hydrocarbon fulfilling 90° C.<T(BP)<130° C. for maintaining single phase of an intermediate polymer solution in a solution polymerization reactor obtained by copolymerizing ethylene and at least one C3 to C8 alpha olefin copolymer and/or of an effluent stream originating from co-polymerization of ethylene and at least one C3 to C8 alpha olefin in solution polymerization during withdrawal from a solution polymerization reactor.

The present invention further pertains to the use of an inert hydrocarbon fulfilling 90° C.<T(BP)<130° C. for maintaining single phase of a heated effluent stream originating from polymerization of ethylene and at least one C3 to C8 alpha olefin in solution polymerization, and heated in a heat exchanger, preferably to at least 180° C., more preferably to at least 200° C. The effluent stream is preferably heated to not more than 280° C., more preferably to not more than 250° C.

An inert hydrocarbon fulfilling 90° C.<T(BP)<130° C. can be used to maintain a single phase upstream the flash separation, that is in the intermediate polymer solution, the effluent stream discharged from solution polymerization reactor and in the heated effluent stream discharged from a heat exchanger.

All preferred embodiments of the process according to the invention as described above are also preferred embodiments of the use according to the invention, if applicable.

In the following the process according to the invention shall be schematically described with respect to FIG. 1, which shows an exemplary representation of a system for use of the process according to the invention. It is self-explanatory that the system may comprise further lines and/or further apparatuses, such as a second flash separation, and/or other means for operating the system, such as valves, as desired.

Figure 1:
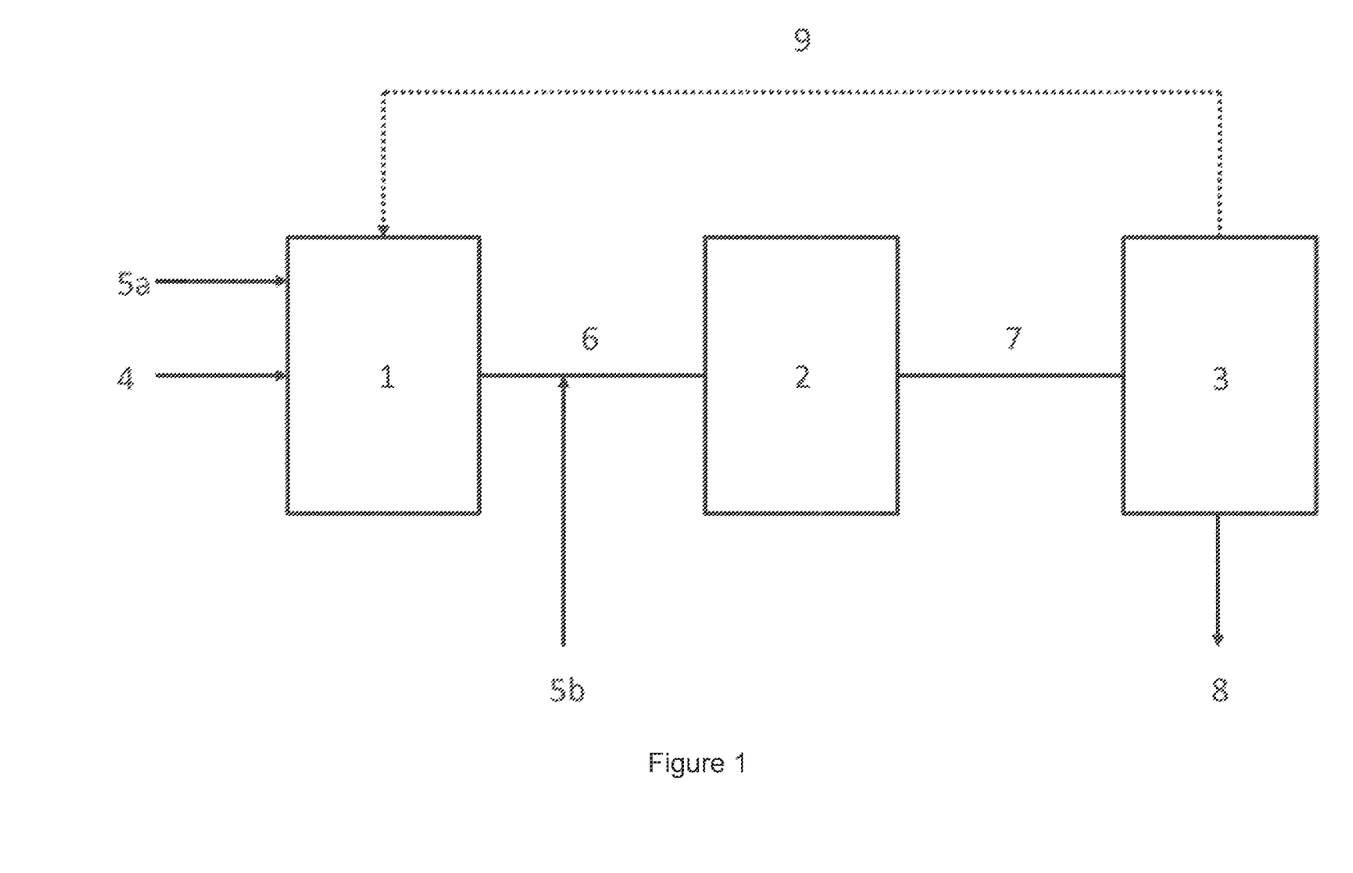

In FIG. 1 ethylene, at least one C3 to C8 alpha olefin and the solvent are fed via an inlet (4) to a solution polymerization reactor (1) and copolymerized. An effluent stream is withdrawn from the reactor (1) and passed through the line (6), the heat exchanger (2) and line (7) to a first flash separator (3). At least a part of the ethylene-C3 to C8 copolymer can be separated in the first flash separator (3) and withdrawn via line (8).

The inert hydrocarbon is usually fed with the monomer, comonomer(s) and solvent via inlet (4) into the solution polymerization reactor (1) and/or via inlet (5b) into line (6) to the effluent stream discharged from the solution polymerization reactor (1). In other embodiments, the inert hydrocarbon can be fed via inlet (5a) directly into the solution polymerization reactor (1).

In preferred embodiments, at least a part of the inert hydrocarbon, such as between 50 and 80 wt. % and typically around 70 wt. % of the inert hydrocarbon, can be recovered during flash separation and is recycled back via line (9), and usually via a reactor feeding vessel, to the solution polymerization reactor (1), enabling the accumulation of inert hydrocarbon in the process. This has the advantage that little or even no new fresh inert hydrocarbon has to be fed to the solution polymerization reactor (1) or the line (6) as described above.

In preferred embodiments, a second flash separation is located downstream of the first flash separation (3). The at least a part of the ethylene-C3 to C8 copolymer separated in the first flash separator (3) and withdrawn via line (8) is fed to the second flash separation for further separation of volatile compounds, such as monomer, comonomer(s) and solvent, from the obtained product copolymer.

Experimental Part and Calculation Methods

Apparatuses for measuring phase separation as well as models and calculation methods for phase separation in polymer—solvent systems are known in the art. Particular reference is made to the following documents, including the references cited therein:

1) de Loos et al., "Liquid—Liquid Phase Separation in Linear Low Density Polyethylene Solvent Systems", Fluid Phase Equilibria 117 (1996) 40-47, 2) Irani et al., "Lower Critical Solution Temperature Behavior of Ethylene Propylene Copolymers in Multicomponent Systems", Journal of Applied Polymer Science, Vol. 31, 1879-1899 (1986), 3) Chan et al., "Fluid-Liquid Transitions of Poly(ethylene-co-octene-1) in Supercritical Ethylene Solutions", Ind. Eng. Chem. Res. 2000, 39, 4370-4375, 4) Nagy et al., "High pressure phase equilibria in the system linear low density polyethylene+isohexane: Experimental results and modelling", J. of Supercritical Fluids 40 (2007) 125-133, and 5) "Handbook of Polymer Synthesis, Characterization, and Processing" First edition, edited by Enrique Saldivar-Guerra, Eduardo Vivaldo-Lima, published 2013 by John Wiley & Sons, Inc, in particular chapter 15, pages 317 to 334.

Table 1 below shows the composition of an effluent stream discharged from a solution polymerization reactor for six examples Ex1 to Ex 6. The pressure (p) in the solution polymerization reactor is given in bar, the temperature in the polymerization reactor was held constant in a temperature range of 140° C. to 250° C. The relative increase of the de-mixing temperature in % is given with respect to Ex1.

Table 1 shows the amounts in wt. % of unreacted ethylene (C2), unreacted comonomer 1-octene, obtained ethylene-1-octene product copolymer (PE) and iso-octene, based on the total weight of the effluent stream. n-hexane as solvent in each example adds up to 100 wt. %.

For the calculation of the de-mixing temperature or cloud point, the models and calculations disclosed in documents 1) to 5) cited above can be used. A suitable model for calculating the cloud points is the modified Sanchez-Lacombe (MSL) equation disclosed in document 4) above (Nagy et. el).

TABLE 1

|  | C2, wt. % | 1-octene, wt. % | PE, wt. % | Iso-octene, wt. % | p, bar | Increase in de-mixing temperature, % |
|---|---|---|---|---|---|---|
| Ex1 | 1.9 | 3.0 | 21.5 | 0.3 | 87 | 0.00 |
| Ex2 | 1.9 | 3.0 | 21.5 | 0.9 | 87 | 0.29 |
| Ex3 | 1.9 | 3.0 | 21.5 | 1.7 | 87 | 0.68 |
| Ex4 | 1.9 | 3.0 | 21.5 | 2.7 | 87 | 1.16 |
| Ex5 | 1.9 | 3.0 | 21.5 | 4.1 | 87 | 1.84 |
| Ex6 | 1.9 | 3.0 | 21.5 | 6.1 | 87 | 2.86 |

It can be seen from Table 1 that increasing the amount of iso-octene results in a higher de-mixing temperature, thus leading to a smoother operation of the process. It has been surprisingly found that an increase of 1 wt. % iso-octene present in the intermediate polymer solution in the solution polymerization reactor increases the de-mixing temperature by about 1° C. In none of examples Ex1 to Ex6 phase separation occurred due to the presence of iso-octene.

These surprising findings are also schematically illustrated in FIG. 2 below, showing an extract of a pressure-temperature (P-T) phase diagram of a polymer-solvent system. Such diagrams are well known in the art, see for instance the aforementioned "Handbook of Polymer Synthesis, Characterization, and Processing", First edition, chapter 15. "UCST" denotes the upper critical solution temperature, and "LCST" the lower critical solution temperature. "UCEP" is the upper critical equilibrium point and "LCEP" the lower critical equilibrium point.

Of particular interest in the present invention is the LCST curve. At temperatures above the LCST curve, the single liquid phase L polymer solution phase separates into two distinct liquid phases LL, one which is "lean" in dissolved product copolymer and one which is "rich" in dissolved product copolymer as discussed above.

Figure 2:
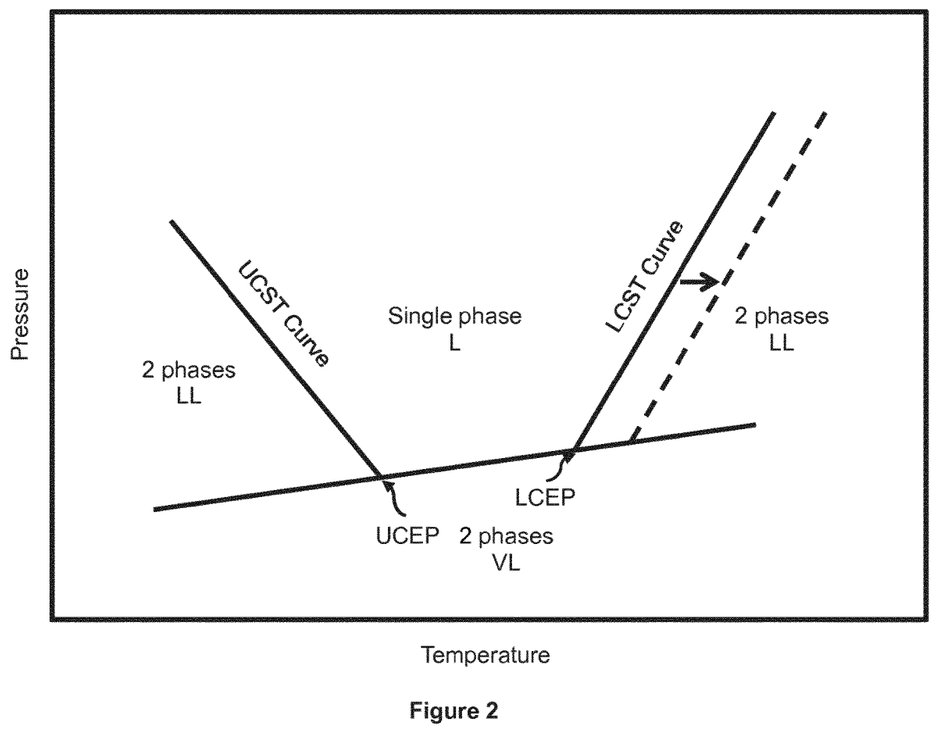

FIG. 2 schematically illustrates the surprising finding of the present invention that adding an inert hydrocarbon fulfilling 90° C.<T(BP)<130° C., in particular iso-octene, to the polymer solution shifts the LCST curve to higher temperatures at a given pressure, see arrow and dotted line in FIG. 2. As discussed above, the LCST or de-mixing temperature of the polymer solution increases, allowing the process to be conducted at a given temperature, but at lower pressures without the occurrence of phase separation. In a further advantageous aspect, the process of the invention can be conducted, if desired, at higher temperatures at a given pressure without the occurrence of phase separation.

The invention claimed is:

1. Process for copolymerizing ethylene and at least one C3 to C8 alpha olefin to obtain an ethylene-C3 to C8 alpha olefin copolymer, the process comprising
   a) copolymerizing ethylene and at least one C3 to C8 alpha olefin in a solvent in a solution polymerization reactor (1) to obtain an intermediate polymer solution,
   b) discharging an effluent stream from the intermediate polymer solution into a heat exchanger (2),
   c) setting a temperature of the effluent stream in the heat exchanger (2) to obtain a heated effluent stream,
   d) feeding the heated effluent stream to a first flash separation (3),
   e) separating at least a part of the ethylene-C3 to C8 alpha olefin copolymer in the first flash separation (3),
   wherein the process further comprises the steps of:
      feeding an inert hydrocarbon having a boiling point T(BP) fulfilling 90° C.<T(BP)<130° C. to the solution polymerization reactor (1);
      and/or
      accumulating an inert hydrocarbon having a boiling point T(BP) fulfilling 90° C.<T(BP)<130° C. during the polymerization reaction;
      and/or
      feeding an inert hydrocarbon having a boiling point T(BP) fulfilling 90° C.<T(BP)<130° C. to the discharged effluent stream of step b), wherein the intermediate polymer solution in the solution polymerization reactor (1) comprises between 0.05 and 30 wt % inert hydrocarbon having a boiling point T(BP) fulfilling 90° C.<T(BP)<130° C., based on a total weight of the intermediate polymer solution.

2. Process according to claim 1, whereby the inert hydrocarbon fulfilling 90° C.<T(BP)<130° C. is a paraffinic hydrocarbon having 7 or 8 carbon atoms, an olefin having 7 or 8 carbon atoms, or mixtures thereof.

3. Process according to claim 1, whereby the inert hydrocarbon having a boiling point T(BP) fulfilling 90° C.<T(BP)<130° C. comprises iso-octene, 4-methyl-3-heptene, 3-ethyl-2-hexene, 3-methyl-3-heptene, 2,3-dimethyl-2-hexene, 3-methyl-2-heptene, 3,4-dimethyl-trans-3-hexene, 2-methyl-2-heptene, or mixtures thereof.

4. Process according to claim 1, wherein copolymerization of ethylene and the at least one C3 to C8 alpha olefin in solution in step a) takes place at a temperature of at least 140° C.

5. Process according to claim 1, wherein in step c) the temperature of the effluent stream is set to a temperature within 200 to 280° C.

6. Process according to claim 1, wherein the pressure in the solution polymerization reactor (1) and/or in the heat exchanger (2) is from 80 to 150 bar.

7. Process according to claim 1, wherein the ethylene-C3 to C8 alpha olefin copolymer separated in step e) is directed into a second flash separation downstream of the first flash separation (3).

8. Process according to claim 1, wherein accumulating the inert hydrocarbon having a boiling point T(BP) fulfilling 90° C.<T(BP)<130° C. during the polymerization reaction is done by
   recovering the inert hydrocarbon from the first flash separation (3) and/or from a second flash separation downstream of the first flash separation (3), and
   recycling the recovered inert hydrocarbon back to the solution polymerisation reactor (1).

9. Process according to claim 1, wherein the obtained ethylene-C3 to C8 alpha olefin copolymer has a weight average molecular weight (Mw) of between 50,000 and 180,000 g/mol, determined according to ISO 16014-4:2012.

10. Process according to claim 1, wherein the obtained ethylene-C3 to C8 alpha olefin copolymer has a melt flow rate MFR2 (2.16 kg, 190° C.) of equal or below 100 g/10 min, determined according to ISO 1133-1.

11. Process according to claim 1, wherein the at least one C3 to C8 alpha olefin is selected from the group of propene, 1-butene, 1-pentene, 1-hexene, 1-heptene and 1-octene, or combinations thereof.

12. Process according to claim 1, wherein the catalyst used in the solution polymerization is a metallocene catalyst or a Ziegler-Natta catalyst.

13. A method for maintaining an intermediate polymer solution in a solution polymerization reactor (1) in a single phase or for maintaining an effluent stream originating from the solution polymerization reactor in a single phase, comprising:

feeding an inert hydrocarbon to the solution polymerization reactor (1);

wherein the intermediate polymer solution is obtained by copolymerizing ethylene and at least one C3 to C8 alpha olefin copolymer in the solution polymerization reactor (1); and wherein the intermediate polymer solution comprises between 0.05 and 30 wt. % of the inert hydrocarbon, based on a total weight of the intermediate polymer solution; and wherein the inert hydrocarbon has a boiling point T(BP) that fullfills an inequality 90° C.<T(BP)<130° C.

14. A method for maintaining a heated effluent stream heated in a heat exchanger (2) in a single phase, comprising:

copolymerizing ethylene and at least one C3 to C8 alpha olefin in a solvent in a solution polymerization reactor (1) to obtain an intermediate polymer solution;

discharging an effluent stream from the intermediate polymer solution into a heat exchanger (2);

feeding an inert hydrocarbon having a boiling point T(BP) fulfilling 90° C.<T(BP)<130° C. to the effluent stream discharged from the solution polymerization reactor (1) into the heat exchanger (2); and setting a temperature of the effluent stream in the heat exchanger (2) to obtain the heated effluent stream;

wherein the intermediate polymer solution comprises between 0.05 and 30 wt. % of the inert hydrocarbon having a boiling point T(BP) fulfilling 90° C.<T(BP)<130° C., based on a total weight of the intermediate polymer solution.

* * * * *